INVENTOR
HAROLD B. MEAD
By [signature] Atty

July 17, 1956    H. B. MEAD    2,754,764
VARIABLE PITCH HYDRAULIC SCREW PUMP
Filed June 25, 1952    3 Sheets-Sheet 2

INVENTOR.
HAROLD B. MEAD

July 17, 1956        H. B. MEAD        2,754,764
VARIABLE PITCH HYDRAULIC SCREW PUMP
Filed June 25, 1952        3 Sheets-Sheet 3
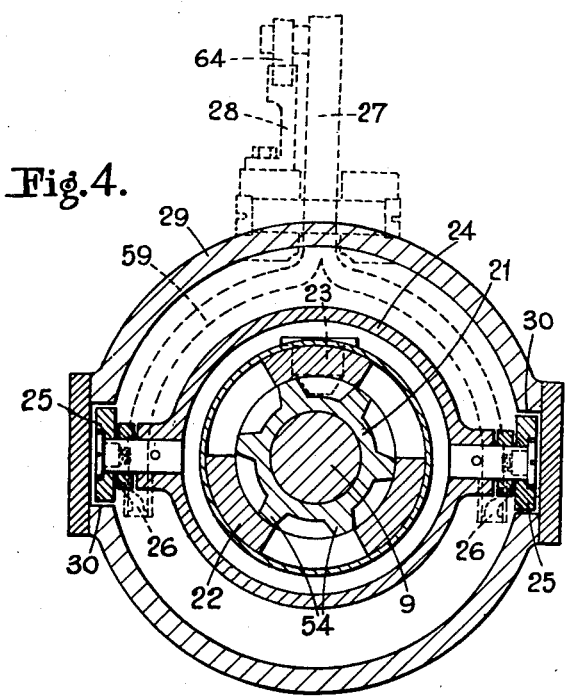
INVENTOR
HAROLD B MEAD United States Patent Office 2,754,764
Patented July 17, 1956

2,754,764

VARIABLE PITCH HYDRAULIC SCREW PUMP

Harold Bertram Mead, Ashford, England

Application June 25, 1952, Serial No. 295,518

Claims priority, application Great Britain July 4, 1951

1 Claim. (Cl. 103—37)

The usual hydraulic gear of the Föttinger type employs bladed wheels whereof the blades are arranged around each wheel after the manner of a turbine to determine according to their relative setting and the number of wheels the flow of liquid in the circuit so that variations of that flow occur with changes of loading applied to the driven shaft, whereby to provide an infinitely variable transmission ratio as between the driving and driven shafts.

The object of the present invention is to provide an improved form of pump unit in a hydraulic variable speed gear. According to the invention there is provided in a variable speed hydraulic coupling, an input shaft, an annular chamber embracing said shaft and coaxial therewith, a housing fixed to rotate with said shaft, impeller blades in said chamber, stub shafts rotationally mounted in said housing radially of and on axes normal to said shaft and respectively carrying said blades offset to the axes of said stub shafts, a torsion rod coaxially mounted within and anchored at one end to said shaft, a sun wheel fixed to said torsion rod at the opposite end thereof and planet wheels meshing with said sun wheel and each fixed to a stub shaft.

In order that the invention may be readily understood and carried into effect, reference will now be made to the accompanying drawings, which illustrate, by way of example, and somewhat diagrammatically, a practical form embodied in a complete hydraulic unit comprising pump and turbine units. In the drawings:

Figures 3 and 4 are cross sectional views of the change speed device embodied in Figure 1 and having the preferred screw coupling between the driven differential and the driven shaft, Figure 3 being taken on line III—III of Figure 1 and Figure 4 being taken generally on the line IV—IV of Figure 1 with the gear lever shown dotted;

Figure 1:
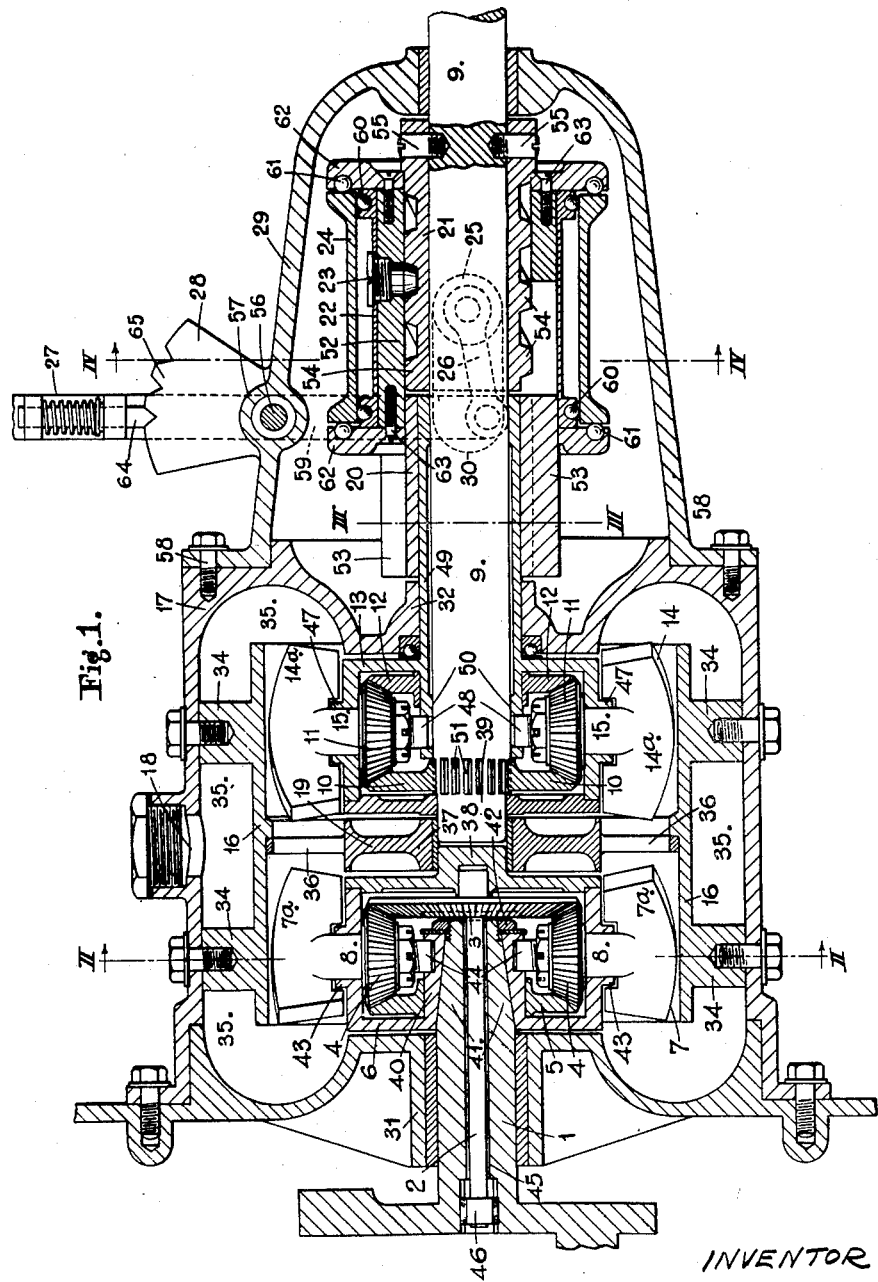
Figure 1 is a longitudinal section of the hydraulic gear unit particularly suitable for road vehicle drives.
Figure 2:
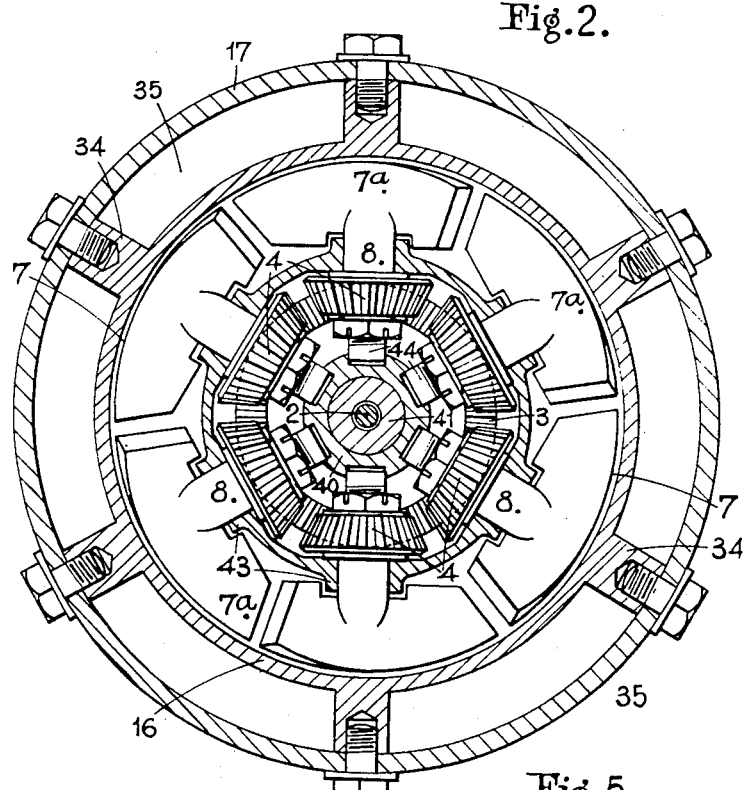
Figure 2 is a section on the line II—II of Figure 1.
Figure 3:
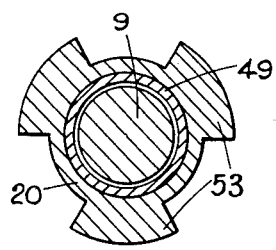

In its simple compact form with reference to Figures 1–5, the pump unit is embodied in a hydraulically sealed casing 17 of rectangular or cylindrical shape which is filled with the power transmitting liquid, such as oil, through a filling orifice 18 which is closed by a suitable plug or cap. The casing has concentric bearings 31, 32 on opposite sides to house axially aligned input and driven shafts 1, 9 which each carry at their respective inner and opposed ends within the main casing 17 a differential gear housing 6 (the input or pump unit) and 13 (the turbine unit) forming the hubs of the respective input and driven screws 7 and 14 which lie within an inner drum 16 open at the ends and secured to and in spaced relation from the outer casing by radial arms 34 to form liquid channels 35, with curved end passages as shown for a closed hydraulic circuit for each pair of adjacent blades 7a, 14a, i. e. one blade of each screw in longitudinal juxtaposition making up the pair. Between the pump unit housing 6 and the turbine unit housing 13 there is provided a central guide 19 having peripherally spaced openings 36 to allow of direct passage of fluid between the driving blades 7 and the driven blades 14 with no intervening guide blades. The central guide 19 is fixed at its outer periphery to the inner drum 16, while its apertured hub 37 provides end bearings for the hub 38 of the driving gear housing 6 and for the inner end 39 of the driven shaft 9.

Differential gears connect together the individual blades 7a, 7a and 14a, 14a of the groups of pairs making up the pump and turbine screws respectively. The pump unit differential comprises a sun wheel assembly which in the form shown consists of a pair of parallel (or sun) bevels 3, 5, one (3) being relatively fixed and the other (5) being loose on the axial boss 40 of driving gear housing 6 which is secured on a tapered spigot 41 of driving shaft by a locking nut 42. Two opposite bevels 4 (planet) at right angles and in permanent mesh with the sun bevels 3, 5 complete the driving differential gear. The planet wheels 4 are carried on the tapered inner ends of stub shafts 8 which are each mounted radially between a bearing boss 43 on the housing 6 and a step bearing 44 in the axial boss 40 of the said housing. On the outer end of each stub shaft 8 is mounted the flat or curved blade 7a, which is axially offset, as previously described, to provide a larger area on one side of the stub shaft 8 than on the other whereby differential pressure in the hydraulic circuit will cause an unbalance on the loading of the blade so that it will turn about the stub shaft axis to compensate for the change, and thus alter the effective gear ratio.

In the present example, there are three pump screws 7 (see Figure 2) and three complementary turbine screws 14, the pump screws having variable pitch blades 7a, while the blades 14a of the turbine screws 14 are normally relatively fixed, but capable of adjustment to give reverse and neutral gear as will hereinafter be described.

To control the variable pitch blades 7a of the pump screws, a torsion rod 2 is mounted within a tubular housing formed by an axial bore 45 in the driving shaft 1, being splined to the latter at one end 46 and carrying at the other end the sun wheel 3, the complementary sun wheel 5 being the idler of the differential gear and running loosely on the axial boss 40 of the housing 6 as above described.

Figure 5:
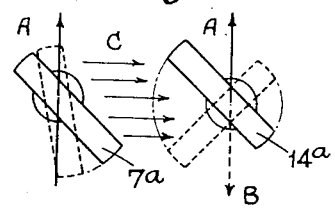
Figure 5 shows diagrammatically the relative pitch positions of a pair of driving and driven blades.

In this instance the turbine unit screws 14 are constructed and arranged similarly to the pump unit screws 7 except that they do not have automatically variable pitch blades 14a and, in the present example, the blades are not offset from the axes of their shafts 15. Thus the screws are connected to the driven shaft 9 by a common differential gear comprising a pair of sun wheels 10 and 12 which are in mesh with planet wheels 11 each carried upon the tapered end of the stub shaft 15 radially mounted between an outer bearing in the boss 47 of the gear housing 13 and an inner footstep bearing 48 in an inner boss 50 of a tubular extension 49 of the said housing 13 which is rotatably free upon the driven shaft 9 but adapted to be coupled thereto by a change speed device to be hereafter discussed. The sun wheel 10 is splined to the inner end of driven shaft 9 as at 51, while the sun wheel 12 is the idler of the differential being rotatably free upon the exterior of the boss 50 of the gear housing extension 49. At the outer ends of the radial stub shafts 15 are fixed the turbine unit or driven blades 14a, which are held by the change speed device aforesaid at 45 degrees pitch (parallel to the driving or pump unit blades 7a) when in highest gear ratio for forward running. The change speed device provides for manually setting the driven blades by turning them through 45 degrees to give a fully feathered (neuatral gear) position and through 90 degrees for reverse gear. Figure 5 shows diagrammatically one pair of complementary driving and driven blades 7a and 14a, the full lines showing the blades in forward running (highest gear) position while the dotted lines show the same blades in lowest gear for the driving blades 7a and reverse gear for the driven blades 14a. In this figure the full line arrows A show the direction of rotation in forward running position of the driving and driven screws (and the driving and driven shafts 1 and 9), the dotted arrow B the reverse rotation of the driven shaft 9 when the driven blades are set to reverse gear position (dotted), and the horizontal arrows C show the direction of pressure of the liquid in the hydraulic circuit 35.

It will be noted that the pump unit blades 7a rotate due to variable loading against the resistance of the torsion rod 2, their angular adjustment about the axes of their respective stub shafts 8 being limited to an amount up to 45 degrees which may be determined by suitable stops not shown.

The change speed device which holds the driven blades normally relatively stationary in angularly set position with respect to the radial axis so that there is no automatic pitch adjustment as with the pump unit screws may consist of a helical screw or worm which can be operative at all speeds and, if required, can be safely used as an emergency brake. In this device or turbine unit, the driven gear housing 13 is revolvable about the common axis of input and driven shafts 1 and 9 respectively to change the setting of blades 14a but is controlled by being connected to driven shaft 9 by a radial tooth 23 (or teeth) which projects internally from a sleeve 22 rotatable with but slidable axially upon the tubular extension 49 of the driven gear housing 13, being connected to the extension 49 by internal splines 52 which are permanently in mesh with external splines 53 of sleeve 20 (Figure 3) which is fixed to the housing extension 49. The radial tooth 23 (or each such radial tooth) engages in the helical teeth 54 of a driven sleeve 21, which is rigidly fixed upon the driven shaft 9 as by shrinking and/or the fixing screws 55. It will thus be seen that the drive to the driven shaft 9 from the hydraulic circuit is via the driven screws 14, the stub shafts 15, the planet wheels 11 and sun wheel 10, and also via the gear housing 13 and tubular extension 49 thereof, the splined sleeve 20, the toothed sleeve 22 with its tooth 23 (or teeth) and the driven sleeve 21. Thus with the sleeve 22 held fixed axially in the rearward position (forward drive) as shown, no relative motion as between sun and planet wheels can take place so that the pitch of the driven blades 14a is held fixed and the driven shaft 9 will rotate in the forward direction. When the toothed sleeve 22 is moved axially to the left as viewed in Figure 1, the helical teeth on the driven sleeve 21 cause the sleeve 22 to turn with the result that the sleeve 20 and gear housing 13 are correspondingly rotated so that the planet wheels 11 roll on the sun wheel 10 and thus the driven blades 14a are angularly adjusted towards the reverse drive position. This change of pitch angle of the driven screw blades is assisted by the pressure of liquid applied to the blades 14a. When they reach the "fully feathered" position—which is midway to the fully coarse pitch of the reverse gear (or vice versa) after 45 degrees of turning as will be readily understood from Figure 5—the blades 14a will be edge on to the hydraulic pressure, i. e. the gear will be in neutral. As the blades 14a pass the mid or neutral position, the hydraulic pressure acts on the reverse side thereof and thus if the driven shaft 9 is rotating in the forward (or reverse as the case may be) direction, the driven blades 14a act as a powerful brake as the pitch coarsens.

The change speed gear device shown provides for positive adjustment of the driven blades 14a and obviates the need for precise timing. Axial movement of the sleeve 22 is effected by the change gear lever 27 which is carried by a pivot 56 which in turn is supported in a bearing boss 57 forming part of an extension 29 of the gear casing 17 being secured thereto by bolts 58. The gear lever 27 has two fork arms 59 forming a stirrup within the casing 29 which straddles the driven shaft 9 and associated sleeve assemblies of the gear change device. The ends of the arms 59 are connected by links 26 to an outer sleeve 24 which surrounds the sleeve 22 and is rotatably mounted thereon by means of bearings 60, being axially located by thrust bearings 61 at each end which are carried in end plates 62 which are secured to the sleeve 22 by screws 63. The outer sleeve 24 is rotatably anchored by means of rollers 25 (Figure 4) which engage in axial guides 30 provided in the casing 29 and parallel to the axial path of movement of the sleeve 22. Thus the outer sleeve 24 can move axially when the gear lever 27 is adjusted but does not rotate when the sleeve 22 rotates with the driven shaft 9.

Axial adjustment of the sleeve 22 in forward, neutral and reverse gear positions is held by a spring controlled catch 64 on the gear lever 27 which co-operates with a toothed quadrant 28 fixed to the casing extension 29, the catch being releasable from the teeth 65 of the quadrant 28 by hand manipulation when the operator is gripping the gear lever 27.

The above described construction provides an infinitely variable hydraulic gear in which are available transmission ratios progressively and continuously from 1:1 when the pitch of the driving screw blades coincides with that of the driven screw blades down to zero when the driving blades have fined to 45 degrees where they impart no driving movement to the liquid in the hydraulic circuit. By suitable arrangements of stops, the range of fining of the blades is restricted to approximately 40 degrees, the amount of slip within the balance of 5 degrees being sufficient to provide a "neutral" gear.

I claim:

In a variable speed hydraulic coupling, an input shaft, an annular chamber embracing said shaft and coaxial therewith, a housing fixed to rotate with said shaft, impeller blades in said chamber, stub shafts rotationally mounted in said housing radially of and on axes normal to said shaft and respectively carrying said blades offset to the axes of said stub shafts, a torsion rod coaxially mounted within and anchored at one end to said shaft, a sun wheel fixed to said torsion rod at the opposite end thereof and planet wheels meshing with said sun wheel and each fixed stub shaft.

References Cited in the file of this patent

UNITED STATES PATENTS

| 913,364 | Crowhurst | Feb. 23, 1909 |
| 1,377,400 | Coppus | May 10, 1921 |
| 2,178,356 | Brunner | Oct. 31, 1939 |
| 2,427,458 | Jandasek | Sept. 16, 1947 |
| 2,471,179 | Wemp | May 24, 1949 |
| 2,505,071 | Stepanoff | Apr. 25, 1950 |
| 2,533,148 | Spiegel | Dec. 5, 1950 |
| 2,597,527 | Mosher | May 20, 1952 |
| 2,627,164 | Halpern | Feb. 3, 1953 |
| 2,640,680 | Altheide | June 2, 1953 |
| 2,675,761 | Peterson | Apr. 20, 1954 |

FOREIGN PATENTS

| 94,287 | Switzerland | May 1, 1922 |